Nov. 6, 1945.    F. HABERLAND    2,388,406
VALVE
Filed July 1, 1943

Inventor:
Frederick Haberland
By Edward C. Fitzhugh
Atty.

Patented Nov. 6, 1945

2,388,406

UNITED STATES PATENT OFFICE 2,388,406

VALVE

Frederick Haberland, Cleveland, Ohio, assignor to Pesco Products Co., a corporation of Ohio Application July 1, 1943, Serial No. 493,048

6 Claims. (Cl. 137—53)

This invention relates to pressure relief valves of a type incorporating a valve unit comprising a valve housing and valve assembly, removable as a unit from the body of the housing in which fluid passages or ports are formed.

In prior valve assemblies of the general type over which the present invention is an improvement, the valve unit embodies a valve housing one end of which is open to form a valve seat and the other end of which is closed to form a dash pot chamber. The present invention contemplates the formation of a bore through the main housing and the employment of a novel auxiliary valve housing closed end performing the additional useful function of a closure for one end of the body bore in which the valve unit is mounted.

Another object of the invention is to provide a valve assembly of the general type indicated, wherein the two ports which communicate with the valve unit may if desired be arranged on a common axis, the invention making this possible by utilizing the closed end of the valve housing to close the bore in which it is seated.

Another object of the invention is to provide a valve assembly of the general type indicated, wherein the valve housing may be completely sealed between the two ports with which it communicates and the bore in which it is mounted. A further object is to provide for such a seal without increasing the length of the valve housing. These objects are attained by arranging for the port or ports to communicate with the central region of the valve instead of the end region thereof as in some of the earliest valve structures, and by utilizing the two end regions of the valve housing as seats for sealing means, sealing both ends of the valve housing in the bore in which it is mounted.

Figure 1:
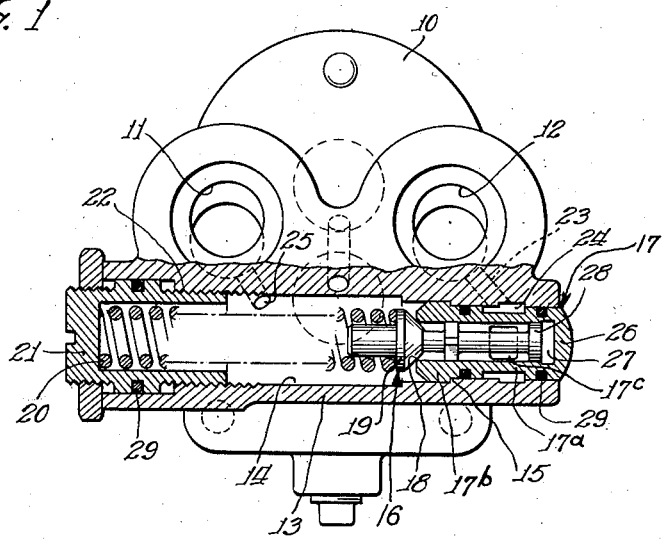
Figure 2:
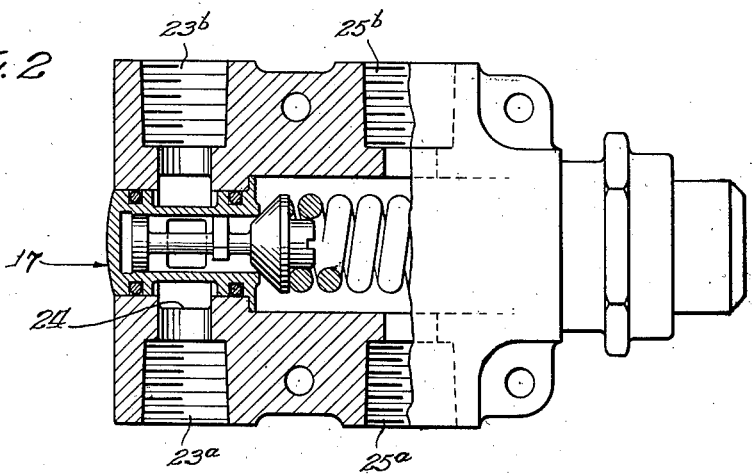

These and other objects and features of this invention will become apparent from the following specification when taken together with the accompanying drawing in which:

Fig. 1 is a sectional view through the valve portion of a feathering type gear pump embodying the invention, the balance of the pump being shown in plan; and Fig. 2 is a longitudinal sectional view of a valve assembly embodying the invention.

The gear pump shown in Fig. 1 by way of example of one complete mechanism in which the invention may be embodied, comprises the casing 10 enclosing a suitable pair of rotors (not shown) adapted to draw fluid through an inlet 11 and deliver it through an outlet 12. The pressure relief valve assembly of my invention is adapted to establish a by-pass from the outlet 12 back to the inlet 11. The valve assembly includes a body 13 having a bore 14 one end of which is reduced to form a stop shoulder 15. In the reduced end of the bore 14 is mounted a valve unit, indicated generally at 16 including a tubular member 17 having a reduced waist portion 17a and a slightly enlarged head portion 17b seated against the shoulder 15 for limiting the outward movement of the insert member when subjected to pressure. The head 17b is open to provide a valve seat 18 against which is seated a valve proper 19. A compression spring 20 is engaged between the valve element 19 and a cap 21 which is threaded at 22 into the bore 14. The spring 20 normally maintains the valve element 19 against the seat 18 and the pressure of the valve element 19 against the seat 18 in turn maintains the head 17a seated against the shoulder 15.

A passage 23 connects the outlet port 12 to an annular space 24 defined between the waist portion 17a of the valve housing and the bore 14. Radial apertures 17c in the tubular insert housing member or auxiliary valve housing 17 permit passage of fluid from the outlet port 12 to the bore 14. A passage 25 permits the fluid to pass from the bore 14 to the inlet bore 11.

In accordance with the present invention the passage 23 communicates with the intermediate waist region 17a of the valve housing 17, the end portion opposite the valve seat 18 being closed by an end wall 26 of auxiliary valve housing or insert member 17 which closed end also functions as a dash pot chamber 27 within the valve housing. The valve element 19 is provided with a piston 28 acting in the chamber 27.

By forming the relief apertures 17c in the intermediate region of the valve housing, it becomes possible to utilize the two axially flanking regions of the auxiliary valve housing 17 as seats for packing rings 29 which seal the auxiliary valve housing to the bore 14 of main housing 10 on both sides of the waist portion 17a. Thus the outer end of the bore 14 is effectively sealed against the escape of fluid therefrom, and the relief passage provided by the valve is effectively sealed when the valve is closed.

In the present invention, the closed end 26 of the insert member or auxiliary valve housing 17 serves the new and additional function of closing the terminal of the bore 14. The pressure acting on insert member or auxiliary valve housing 17 performs the additional and very valuable function of holding the same in place with the head 17b thus in engagement with the stop shoulder 15. Thus the present invention provides greater flexibility of design without in any way detracting from the advantageous function of the prior valve constructions.

It will now appear that in the operation of valve assembly 16, tubular member 17 will be maintained at all times with enlarged head 17b held in engagement with shoulder 15 of the housing by virtue of the action of the pressure fluid delivered from pump outlet 12 through passage 23. Upon the occurrence of a selected value of maximum pressure, determined by the adjustment of threaded closure plug 21, the pressure fluid acting on the underside of valve 19 will cause this valve to be raised from its seat 18 allowing the pressure fluid to be returned through passage 25 to the pump inlet 11. Dash-pot piston 28 functions in the usual manner to control the rate of flow of fluid between the opposite sides thereof in the movement of the valve back and forth to thus control the rate of such valve movement and prevent hunting, as well as allowing the pressure fluid to act against the closed end of tubular member 17 thus assuring the maintenance of enlarged head 17b in engaged relation with shoulder 15.

In the form of the invention shown in Fig. 2, the alternative construction and arrangement of parts are essentially the same. It is noted that instead of the single port 23 communicating with the valve unit 16, there is provided a pair of axially aligned ports 23a and 23b communicating respectively with the opposite sides of the valve unit, and instead of the single port 25 communicating with the bore 14, there is provided a pair of axially aligned ports 25a and 25b communicating respectively with the opposite sides of the bore. The axial alignment of the ports 23a and 23b is made possible by the provision for closing the end of the bore 14 by the closed end of the valve housing.

While I have disclosed my invention in connection with certain specific embodiments thereof, it is to be understood that these are by way of example rather than limitation, and it is intended that the invention be defined by the appended claims which should be given a scope as broad as consistent with the prior art.

I claim:

1. In combination with a body having a port therein and having a bore for communication with said port, a valve assembly including a valve housing one end of which is open to provide a valve seat and is formed with a head seated against a shoulder in said bore, the other end of said valve housing being closed to form a dash pot chamber, a valve element engageable with said seat and having an extension formed with a piston operating in said chamber to form a dash pot, means yieldingly engaging said element to normally maintain it against its seat and to maintain the head of said housing engaged against said shoulder, said closed end of the valve housing serving to close the end of said bore, said housing having, intermediate its ends, an aperture communicating with said port.

2. In combination with a body having a bore therein one end of which is constricted to form a shoulder therein, said body also having a port communicating with said bore, a unitary valve assembly including a valve housing removably seated in said constricted end of the bore and having an enlarged portion engaged against said shoulder, one end of said housing being open to define a valve seat and the other end being closed to form a dash pot chamber and also serving to close the end of said bore, a valve element engaged against said seat and having an extension formed with a piston cooperating with said chamber to form a dash pot, means yieldingly maintaining said valve element in engagement with said seat and maintaining said housing in engagement with said shoulder, said housing having an aperture communicating with said bore.

3. A valve assembly as defined in claim 2, wherein said aperture is located intermediate the end portions of said valve housing and said end portions are provided with packing means sealing the same within said bore on both sides of said port.

4. The valve assembly as defined in claim 2, wherein said port comprises a pair of axially aligned openings communicating with opposite sides of the intermediate region of said valve housing.

5. In combination with a body having a port therein and having a bore in communication with said port, said bore being constricted at one end to define a shoulder, a unitary valve assembly including a valve housing removably seated in said bore and engaged against said shoulder, the valve housing having end portions sealed to said bore on either side of said port and an intermediate portion spaced from said bore to define an annular passage communicating with said port, and having an aperture establishing communications between its interior and said annular passage, the inner end of said valve housing being open to define a valve seat and the outer end being closed to close said bore, a valve element seated against said valve seat, and means yieldingly urging said valve element against said seat and urging said valve housing against said shoulder.

6. A valve assembly as defined in claim 5, wherein said end portions of the housing are relatively thick and the seals of said end portions comprise annular packing channels in said end portions and wherein at least a portion of said annular passage comprises an intermediate waist portion of said housing of reduced diameter.

FREDERICK HABERLAND.